UNITED STATES PATENT OFFICE.

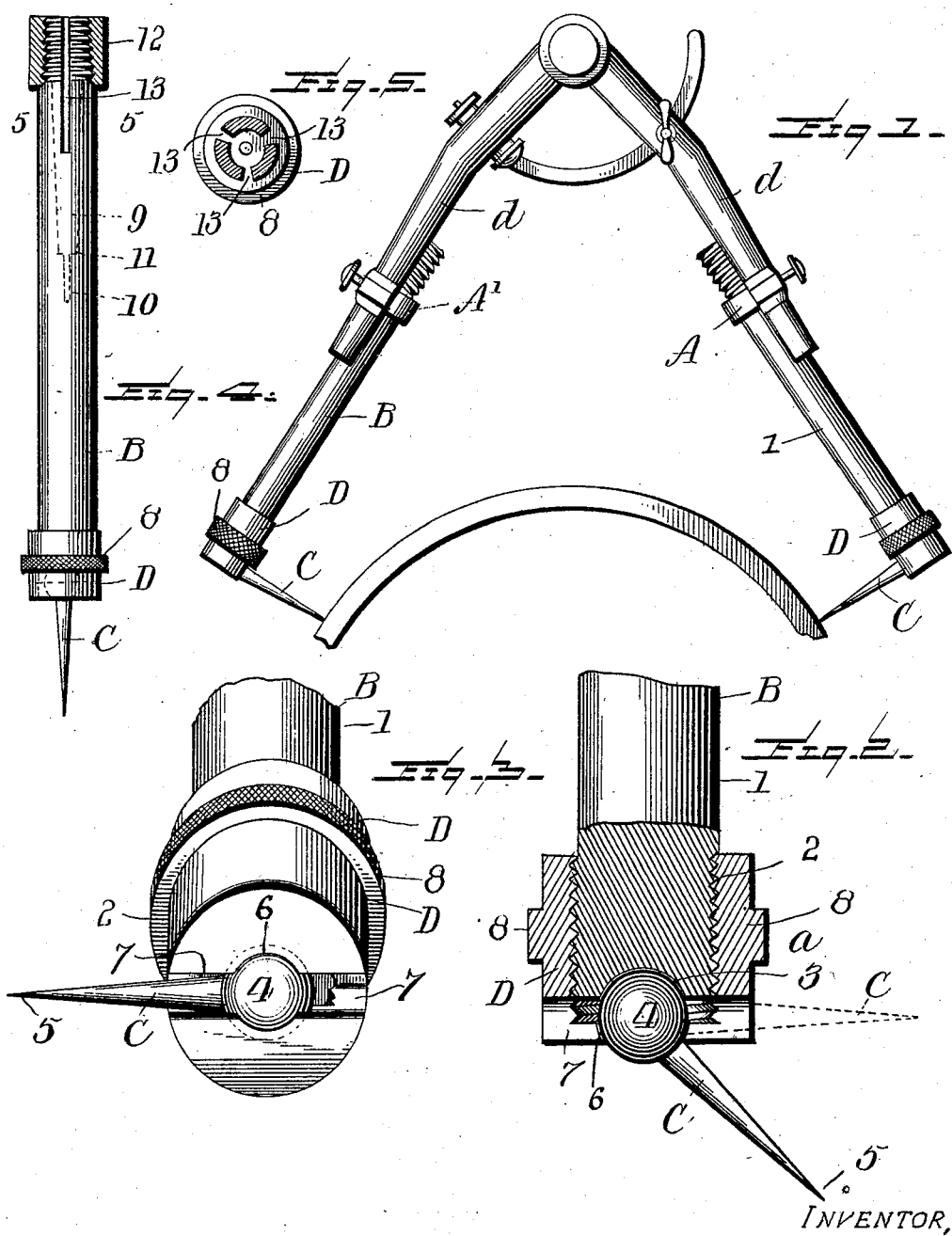

DANIEL FREULER, OF JOLIET, ILLINOIS.

COMPASSES.

SPECIFICATION forming part of Letters Patent No. 682,539, dated September 10, 1901.

Application filed May 28, 1901. Serial No. 62,296. (No model.)

*To all whom it may concern:*

Be it known that I, DANIEL FREULER, a citizen of the United States, residing at Joliet, in the county of Will and State of Illinois, have invented certain new and useful Improvements in Compasses and Like Instruments, of which the following is a specification.

My invention relates to compasses, dividers, and like drafting and measuring instruments, and has for its object to provide an attachment which may be readily attached to any ordinary form of dividers or compasses and which is provided with a needle point or tip capable of universal adjustment to a certain extent, whereby it may be moved to a position perpendicular to the plane of the surface to be measured or operated upon at the point of contact, thereby insuring the greatest accuracy of measurement.

Compasses equipped with my attachment may be used to locate points or find distances upon any surface, plane or otherwise; but it is particularly useful in taking measurements on convex or concave surfaces. For this purpose the ordinary compasses are ill adapted, for the reason that if the points to be located or measured be separated by an arc of a considerable degree the compass-points touch at the points to be located at such acute angles to the surface that they are apt to slip and great difficulty is experienced in obtaining accurate results. The ordinary forms of calipers, on the other hand, can be used only upon convex or concave surfaces, but not upon both, or upon plane surfaces. By the use of my invention, however, the ordinary compasses or dividers in addition to their ordinary function of measuring plane surfaces may be made to serve the purposes of either "inside" or "outside" calipers for the measurement of concave, convex, or irregular surfaces, a simple change of adjustment of the needle-points being the only alteration required to insure said needle-points touching the exact points to be located or measured at right angles to the planes of the surfaces in which such points are situated, to effect the desired measurements.

In the drawings, Figure 1 is a side elevation of a pair of extension-compasses equipped with my attachment. Fig. 2 is an enlarged cross-sectional view showing the construction of the needle-tip and its holding means. Fig. 3 is a perspective view of the lower end of the attachment. Fig. 4 is an elevation of an attachment embodying my invention detached, showing in dotted lines the arrangement of the recess in the upper end thereof. Fig. 5 is a section on the line 5 5 of Fig. 4.

A represents a pair of extension compasses or dividers of an ordinary form, to the legs *a* of which are attached a pair of my attachments B B, the latter being secured by means of the ordinary straps or collars A', as shown in Fig. 1, or by other means to be hereinafter described. Each attachment, designated as a whole by B, consists of a leg formed of a rod or bar 1, the lower end of which is screw-threaded, as at 2, and the extremity of which is provided with a concave socket 3 to receive the spherical end 4 of the needle-point C. Said point C is preferably of the shape shown, having a substantially spherical or ball-shaped head 4 and an elongated sharpened point 5. The ball end of the needle-point is retained in position in the socket 3 by a cap D, interiorly screw-threaded to engage the threads 2 on the bar 1. The cap D is provided with a circular opening 6 in its lower or covered end, through which the point 5 of the needle-tip C extends, the interior edges of said aperture 6 being slightly concaved, as shown, to fit snugly upon the head or ball portion of the needle-point. This arrangement of the parts described permits the free movement of the point 5 in any desired direction to a certain extent, the ball or head 4 turning freely in the socket 3. As will be seen, however, this movement is limited by the size of the opening 6 in the cap D, so that the point 5 can be turned only until the point strikes the edge of the aperture 6, as shown in full lines in Fig. 2. As it may at times, however, be desirable to turn the point 5 to a position at right angles to the axis of the bar 1, (shown in Fig. 1,) I prefer that the cap D should be formed with one or more kerfs or slots 7, extending diametrically across it and arranged to receive the point 5. This permits such point to be moved to the position shown in Fig. 1 and in dotted lines in Fig. 2. The tip or point is secured in its adjusted position by screwing the cap D upon the leg 1 until the edges of the aperture 6 press the ball or head 4 of the point against the socket 3 with sufficient force to hold it firmly. In order to facilitate this adjustment, I prefer that the cap D should be provided with a milled flange 8, as shown, to afford a good finger-hold.

I have illustrated in the drawings a pair of dividers having two needle-points; but it is obvious that a pen or pencil point provided with a ball-head might be substituted for one of such points or that but a single point of the construction shown might be employed for some purposes.

In Fig. 4 of the drawings the construction of the upper end of the attachment is illustrated. As shown in dotted lines, the end is provided with a tapered hole 9, largest at its outer end and gradually decreasing in diameter as it approaches its inner end. This tapered recess ends abruptly, and a small straight boring 10 extends from the bottom thereof downward a short distance, thus forming a shoulder 11 between the two recesses. The upper end of the rod 1 is exteriorly tapered and screw-threaded to receive a tapered nut 12, and a series of slits 13, extending from the central recess to the exterior of the rod, are formed in the upper end thereof to give resiliency to the same. In order to secure my attachment to an ordinary straight compass-leg, the nut 12 is loosened and the leg of the compass inserted in the boring 9 until the lower end thereof bears securely against the shoulder 11, the pointed extremity of such leg extending into the straight boring or recess 10, so that it is protected from being blunted. The nut 12 is then screwed down upon the tapered end of the rod, forcing the yielding segments of the split end together, and thereby firmly clamping the attachment upon the compass-leg.

While I have described my invention as a compass attachment and prefer to so embody it, it is clear that certain features thereof could be applied equally well to the compass proper, and I do not desire to be limited to the exact structure illustrated in the drawings as one embodiment of my said invention.

Having thus described my invention, what I claim, and desire to secure by Letters Patent, is—

1. Compasses or dividers provided with a point having a ball-and-socket connection with the leg thereof, to secure a universal adjustment, substantially as set forth.

2. Compasses or dividers provided with a point having a ball-and-socket connection with the leg thereof to secure a universal adjustment, and means for securing the point in adjusted positions, substantially as set forth.

3. Compasses or dividers provided with a point having a spherical head, a socket in the leg to receive said head, and a cap for retaining said head in said socket, the cap being provided with an aperture through which extends the needle-point, substantially as set forth.

4. Compasses or dividers provided with a point having a spherical head, a socket in the leg to receive said head, a cap having screw-threaded connection with said leg to retain said head in said socket, said cap being provided with a central aperture in its lower end, and slots extending radially therefrom, substantially as and for the purposes described.

5. An extension attachment for compasses consisting of a leg having a tapered resilient end screw-threaded to receive a corresponding nut and provided with a recess extending longitudinally within said tapered end, the recess being tapered toward the bottom thereof, and having a smaller, straight recess extending centrally from the bottom thereof, whereby a shoulder 11 is formed between said recesses, substantially as and for the purpose set forth.

DANIEL FREULER.

Witnesses:
LILLIAN B. ANTRAM,
ANGELA BECHER.